F. E. SUTHERLAND.
POWER HAMMER.
APPLICATION FILED JUNE 23, 1908.
953,768.
Patented Apr. 5, 1910.
6 SHEETS—SHEET 1.
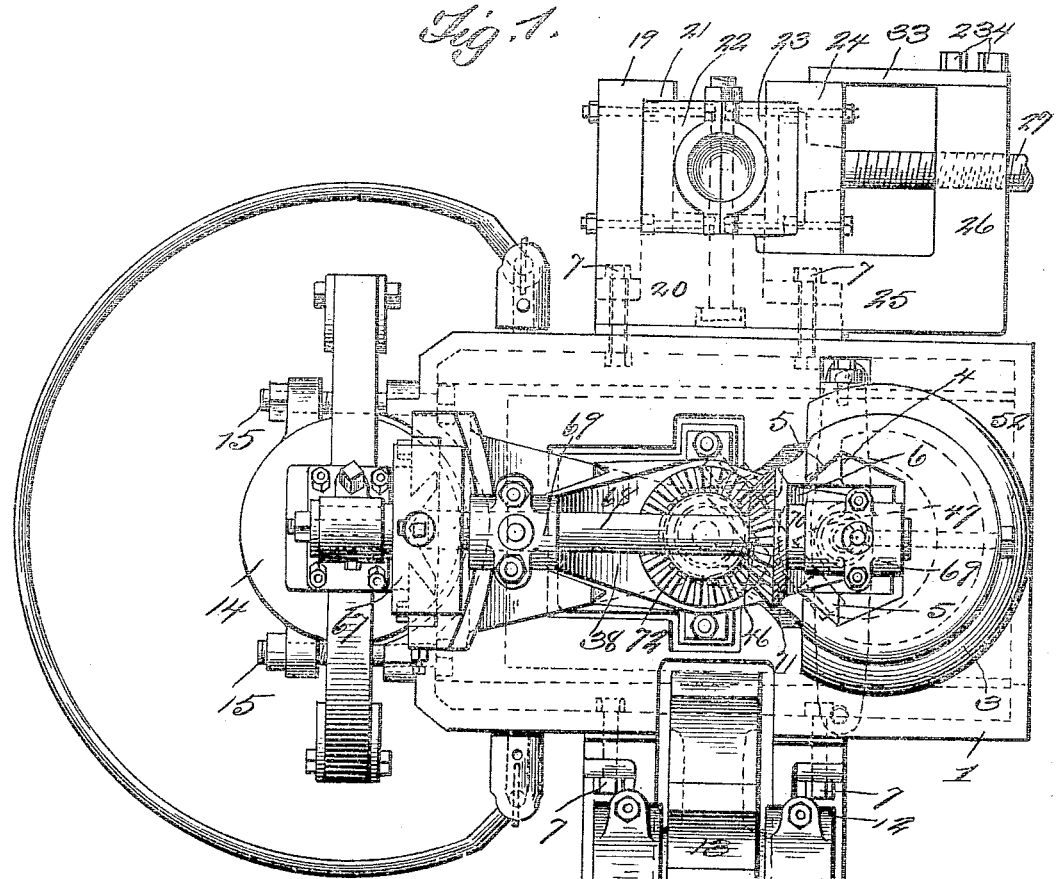
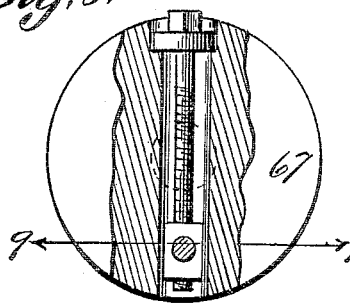
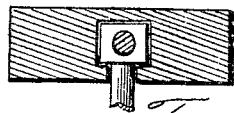
Witnesses
Inventor
Fred E. Sutherland
By Cochran & Co.
Attorneys

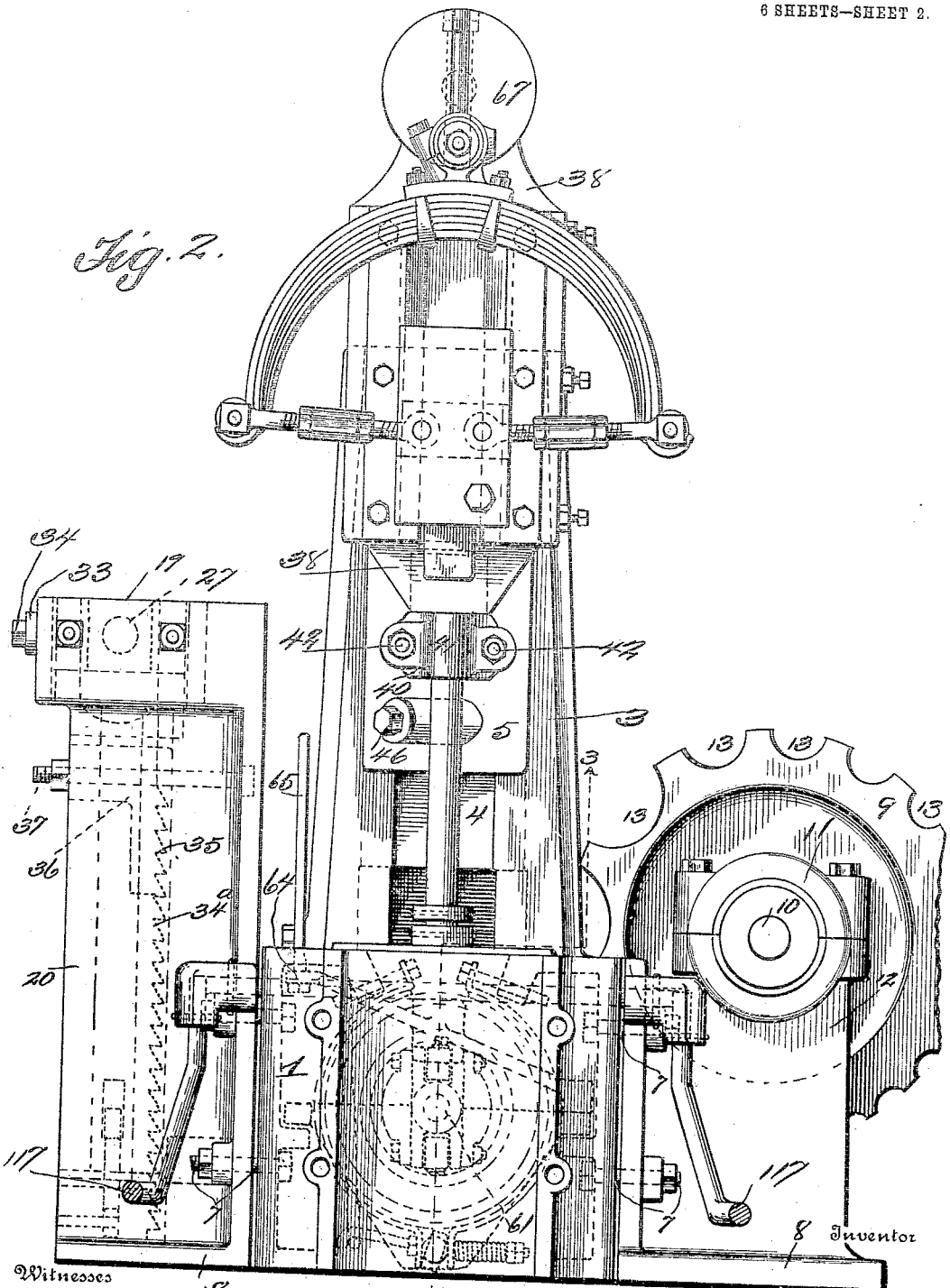

F. E. SUTHERLAND.
POWER HAMMER.
APPLICATION FILED JUNE 23, 1908.
953,768.
Patented Apr. 5, 1910.
6 SHEETS—SHEET 3.
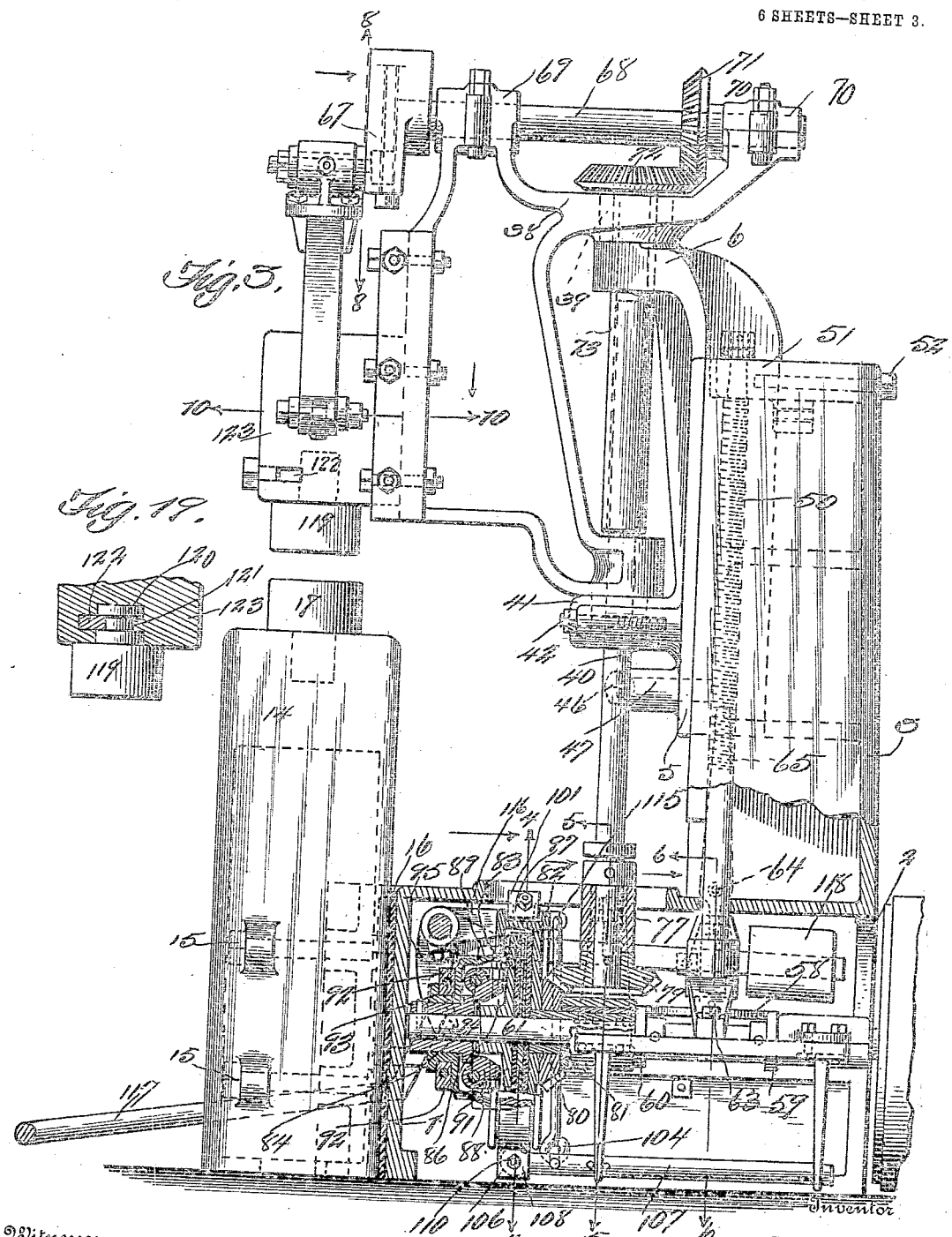
Witnesses
R. A. Bowell
E. M. Bond
Inventor
Fred E. Sutherland
By Cochran & Co
Attorneys F. E. SUTHERLAND.
POWER HAMMER.
APPLICATION FILED JUNE 23, 1903.
953,768.
Patented Apr. 5, 1910.
6 SHEETS—SHEET 4.
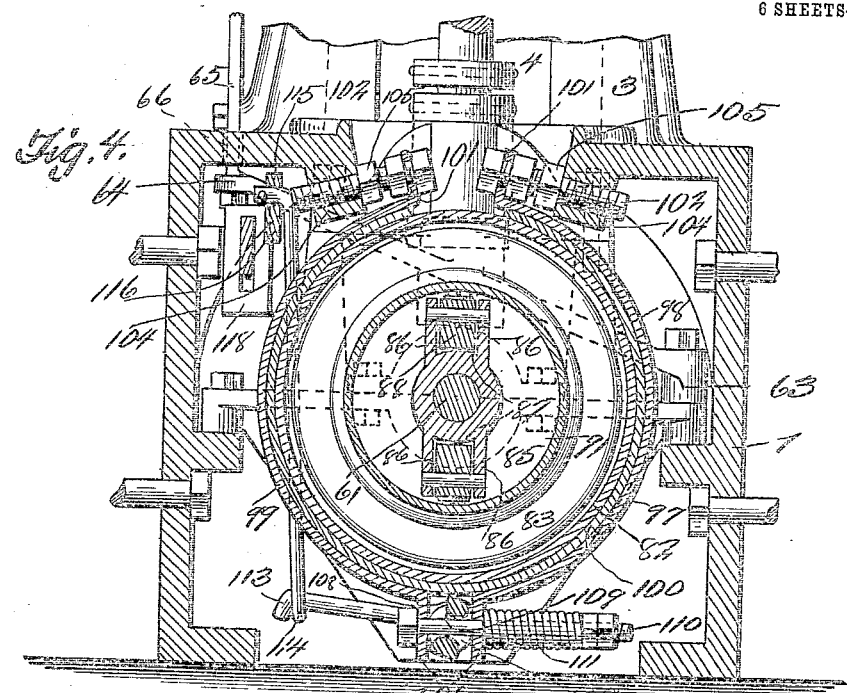
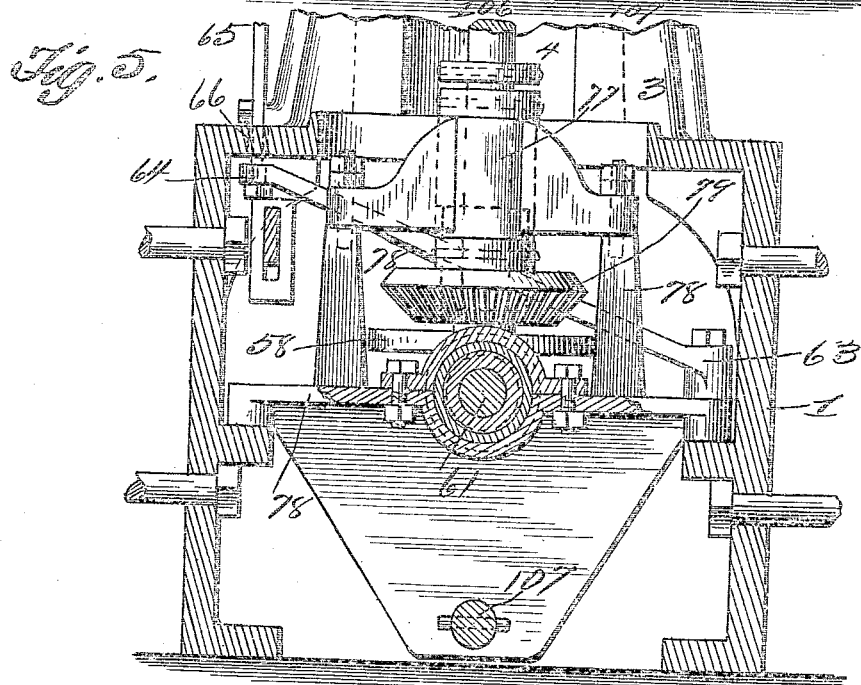

F. E. SUTHERLAND.
POWER HAMMER.
APPLICATION FILED JUNE 23, 1908.
953,768.
Patented Apr. 5, 1910.
6 SHEETS—SHEET 5.
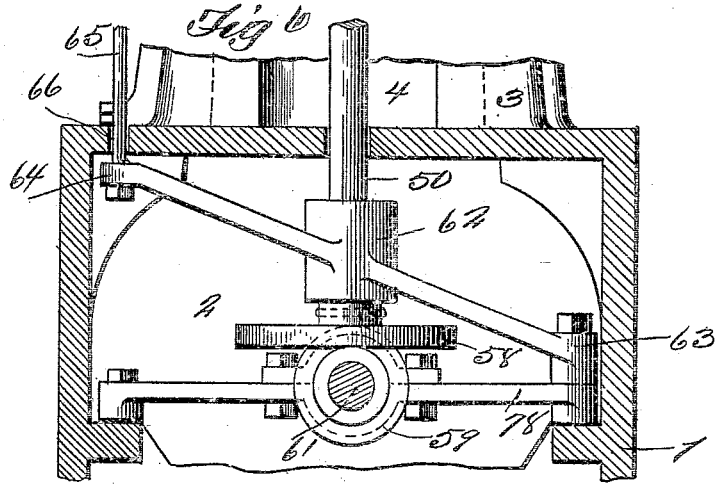
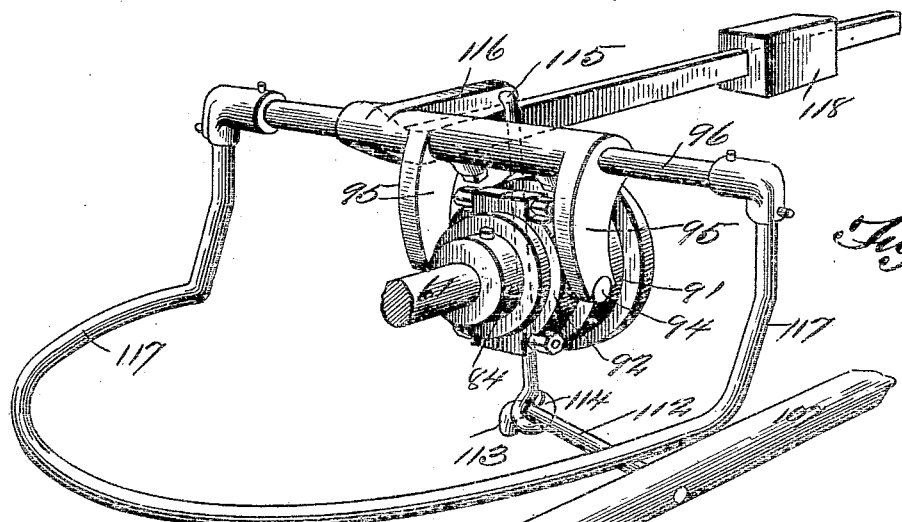
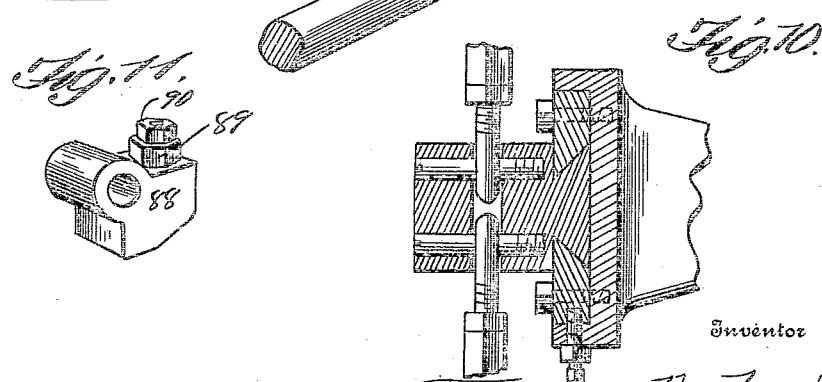
Witnesses
R. H. Coswell
E. H. Bond
Inventor
Fred E. Sutherland
By Cochran & Co.
Attorneys

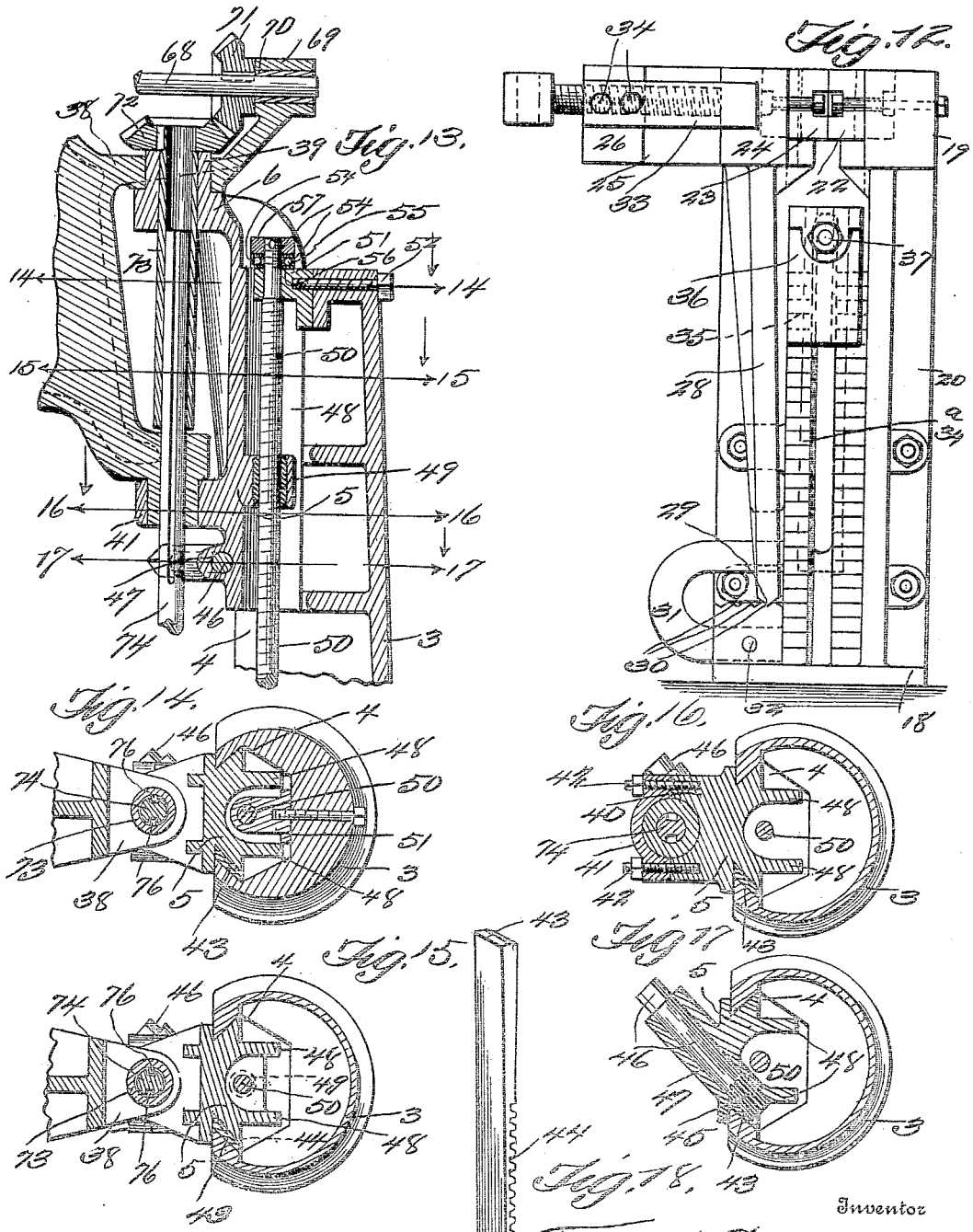

UNITED STATES PATENT OFFICE.

FRED E. SUTHERLAND, OF LOS ANGELES, CALIFORNIA, ASSIGNOR, BY DIRECT AND MESNE ASSIGNMENTS, TO THE RADIAL POWER HAMMER COMPANY, OF LOS ANGELES, CALIFORNIA, A CORPORATION OF CALIFORNIA.

POWER-HAMMER.

953,768.  Specification of Letters Patent.  Patented Apr. 5, 1910.

Application filed June 23, 1908. Serial No. 440,003.

*To all whom it may concern:*

Be it known that I, FRED E. SUTHERLAND, a citizen of the United States, residing at Los Angeles, in the county of Los Angeles and State of California, have invented certain new and useful Improvements in Power-Hammers, of which the following is a specification.

This invention relates to certain new and useful improvements in power hammers, the object of the present invention being to provide a power hammer that may be instantly applied to one of several different anvils or the like arranged within the scope of the movable hammer device. This generic idea is capable of embodiment in a variety of forms and in the present instance I have chosen to show its embodiment in a radial machine, that is, where the hammer arm is mounted for radial movement to bring it into operative relation with the anvils, etc.

I aim further at improvements in the details of construction whereby improved results are attained.

Other objects and advantages of the invention will hereinafter appear and the novel features thereof will be particularly pointed out in the appended claims.

The invention is clearly illustrated in the accompanying drawings which, with the numerals of reference marked thereon, form a part of this specification and in which—

Figure 1 is a plan view of a power hammer embodying my improvements. Fig. 2 is an elevation thereof. Fig. 3 is a view at right angles to Fig. 2 with the lower portion thereof only in section, the section being taken as on the line 3—3 of Fig. 2 looking in the direction of the arrow in the latter figure. Fig. 4 is a vertical section on the line 4—4 of Fig. 3 looking in the direction of the arrow. Fig. 5 is a vertical section on the line 5—5 of Fig. 3 looking in the direction of the arrow. Fig. 6 is a vertical section on the line 6—6 of Fig. 3 looking in the direction of the arrow. Fig. 7 is a perspective view of the mechanism for controlling the raising and lowering of the slide. Fig. 8 is an enlarged view partly in elevation and partly in section, with portions broken away, on the line 8—8 of Fig. 3 looking in the direction of the arrow. Fig. 9 is a section on the line 9—9 of Fig. 8. Fig. 10 is a section on the line 10—10 of Fig. 3. Fig. 11 is a perspective detail of one of the disk-engaging levers. Fig. 12 is a face view of the vise. Fig. 13 is a vertical section of the column, slide, and arm. Fig. 14 is a cross section on line 14—14 of Fig. 13. Fig. 15 is a cross section on line 15—15 of Fig. 13. Fig. 16 is a cross section on line 16—16 of Fig. 13. Fig. 17 is a cross section on line 17—17 of Fig. 13. Fig. 18 is a perspective view of the tapering gib. Fig. 19 is a sectional detail showing a die securing means.

Like numerals of reference indicate like parts throughout the several views.

Referring now to the drawings 1 designates the base portion open at one side, as shown at 2 in Fig. 3, said base being shown as practically hollow and serving as a casing for the operating parts disposed at the lower portion or base of the device, as will be best understood from reference to Fig. 3. From the base 1 rises the column or vertical member 3 in the inner face of which is formed a dove tail guideway 4, as seen best in Fig. 1, in which is guided the slide 5, the upper end of which terminates in the horizontal portion 6 forming the crane, said horizontal portion having an opening therethrough for a purpose soon to be described. Around this base, in this instance shown as disposed substantially in a circle described about the vertical shaft soon to be described as a center, are the various anvils, swage block etc. in connection with which the hammer is designed for use. These anvils etc. may be supported in any suitable manner, either upon independent bases separably secured in position, or upon bases which may be secured to the base 1 in any suitable manner as for instance by bolts 7, as seen in Fig. 2, wherein are shown the base 8 supporting the swage block 9 mounted upon trunnions 10 journaled in suitable bearings 11 on the bracket or upright 12 on the base 8. This swage block is circular in form and having upon its outer circumference grooves, depressions or the like 13, as shown clearly in Fig. 2, of any special or required design adapted for swaging round, square, hexagonal, or other shapes, it may be instantly revolved upon its trunnions so that any one of said grooves or depressions may be brought beneath the center of the hammer as occasion may require. As shown, the top surface of the swage block is lower or of less height than the regular anvil dies, so as to admit of the use of a hand top swaging tool, so that the operator may hold the work in one hand, with the top tool in the other, and arranging the same so that it shall be struck by the die in the hammer head.

14 is the main anvil block, in this instance shown as secured to the base casting 1 by suitable bolts 15 with lead or any other suitable material 16 therebetween, as seen in Fig. 3, to absorb the shock. This anvil is of ordinary type and proportions and adapted to receive dies 17 of plain design or of any special configuration for any particular purpose.

Fig. 1 shows the relative arrangement of the swage block, the main anvil block and the vise now to be described, and their position relatively to the swinging arm of the hammer, showing the manner in which the latter may be used in connection with any desired one of the above named devices, it being understood of course that in use the hammer is swung into position over the swage block, the main anvil block, or the vise as occasion may require. This vise is disposed on the left side of the machine, opposite the swage block, as seen best in Figs. 1 and 2. This vise answers all of the purposes usually obtained in a blacksmith's vise and an upsetting machine. It is supported upon a suitable base 18 bolted to the base casting 1, as shown clearly in Figs. 1 and 2, one jaw 19 thereof being cast solid with the standard 20 rising from said base and having a recess 21 adapted to receive a die 22 of any suitable shape for round, flat, square or other shaped material as may be desired. This die block, as well as the die block 23 in the movable jaw 24, is bolted into place by bolts let into grooves in the ends of the die, said grooves being so shaped that the die may be reversed to use all four corners to the work. Extending back from the frame or support of the vise is an arm 25 bent round or extended at an angle, as seen at 26, behind the movable jaw, and through the member 26 there is threaded a screw 27 for adjusting the movable jaw and setting the same firmly against the work, as will be clearly understood by reference to Fig. 1. This movable jaw has a leg extending down to the base of the standard, as seen in Fig. 12, and this leg 28 has its lower end pointed or oppositely tapered, as shown at 29, to engage in V shaped grooves 30, as seen in said Fig. 12, to hold it parallel and in any desired position. It is held down in place by a U-shaped forging 31 slipped into core holes and secured in place by a pin 32. The upper end of the movable jaw is held in place by a projecting bar 33 preferably of steel bolted to the extended end of the member 26 of the arm 25 by bolts 34, as seen best in Fig. 1, the other end of the projecting bar bearing against the movable jaw in opposition to the arm 25, thus serving as a guide for the movable jaw in its movements as well as holding said jaw to its place. The inner face of the standard is notched, as seen at 34ª in Fig. 2, and adapted to engage similar notches 35 on the face of an adjustable shelf 36 which is secured in place by a bolt 37 running through the standard to a groove on the back side thereof, as seen in Figs. 2 and 12. This shelf is designed to support the work at a predetermined distance from the top of the vise jaw, and is particularly useful where several pieces of the same length are to be operated upon. It is readily adjusted to the required height and then firmly secured in such adjusted position by means of the bolt and the interengaging notches on the depending portion of the shelf and the adjacent face of the standard, all as will be clearly understood from Figs. 2 and 12. It is to be understood of course that the hammer arm is adapted to be swung around so as to bring the hammer over this vise the same as it is swung to bring the hammer over the swage block or the anvil. The pivoted support of the hammer is so designed that it may be operated in any position whatever, either over the tools just described, or between them, and it may be operated firmly secured in place or it may be operated and swung at the same time. This latter feature is particularly valuable in case that work is being bent in the jaws of the vise, a slight bend being first given by hand, then bringing the hammer into play the bar would be hammered quickly down to its proper angle.

The face of the upright column 3, which is integral or rigid with the base, is, as before stated, provided with a vertical guideway 4 in which the slide 5 is supported and adjustable. The hammer mechanism is mounted upon the extended face of an arm or bracket 38 which is pivotally mounted upon said slide, as seen clearly in Fig. 3. The swinging arm at the upper end is bored to fit over a turned sleeve 39 carried by the slide. The lower end is fitted to a boxing 40 projecting from the lower end of the slide, this boxing or boss being provided with a loose cap 41 held by bolts 42 and means for instantly adjusting the cap to clamp the swinging arm in any desired position, so that the arm may be placed in any position through a swing of 180° or more, the purpose of which will be apparent. The slide 5 supporting the arm 38 is fitted to the upright column in dove-tail guides, as before stated, to have a vertical adjustment above and below the ordinary position for use with the front anvil. To lock this slide in position, and compensate for wear, there is provided a long, tapering gib 43 fitted to one side guide, having at its lower end rack teeth 44 cut in its face, adapted to engage a pinion 45 cut upon the end of a short shaft 46, journaled in a diagonal hole 47 in the lower end of the guide. Turning this short shaft with a wrench or lever serves to pull the wedge upward and loosen the same. Upon the back of the slide between the flanges 48 which form the stiffening ribs of it, is a nut 49 cast of babbitt, around the adjusting screw and within the cast iron slide. The upper end of this screw 50 is journaled in a bracket 51, secured to the top of the upright column 3 by suitable means as a long screw 52, and this journal is provided with a thrust bearing, composed of two thin rings 54, a ball ring 55 and balls 56, and a collar 57 screwed and pinned to the upper end of the screw. This screw extends down into the base casting and has upon its lower end a case hardened steel disk 58, the edges of which are adapted to engage hardened steel driving collars 59 and 60 upon the main drive shaft 61. Above this disk is a bearing 62 pivoted at one end, as at 63, to the base and at the other end, as at 64, to a short lever 65 extending up through an opening 66 in the top of the base outside the column. Pressing this lever in either direction engages the disk with one of the collars, and serves to turn the screw in either direction for raising or lowering the slide.

The method of driving the hammer is clearly shown in Figs. 1, 2 and 3. The hammer mechanism is of the ordinary type, having a hammer head working in vertical guides, operated by a crank, connection between this crank and the hammer head being made by a C shaped spring with turn buckle tension links, so that the suspension is flexible. The crank 67 is keyed on a short horizontal shaft 68, journaled in boxes 69 and 70 on the upper part of the swinging arm 38. Near the rear bearing 70 is a miter gear 71, which meshes with a mating gear 72, keyed on the upper end of a long sleeve 73. This sleeve is journaled through the upper end 6 of the slide 5, which supports the swinging arm 38. Fitted to the inside of this sleeve is a shaft 74, having keyways adapted to engage suitable feather keys 76, fastened to the inside of the sleeve. This shaft is journaled at its upper end in the lower end of the swinging arm pivot, and at the lower end is journaled in a boxing 77, which is bolted to a sub-frame 78, which contains all of the clutch mechanism within the base casting. It will be seen that the turning movement of the shaft is transmitted through the sleeve to the miter gears and to the hammer crank, and at the same time the head is free to be raised or lowered as desired. At the lower end of this shaft is another pair of miter gears, one 79 keyed upon the shaft and the other 80 fastened upon a sleeve 81, which is integral with the brake drum 82 and clutch disk 83, as shown in the sectional views, Figs. 4 and 5. This sleeve runs loose upon the main shaft and is journaled in the sub-frame casting. The main shaft extends through the clutch mechanism and has upon its inner end a collar 84 pinned in place to take the thrust strain. Between this collar and the brake drum 82 is a disk 85 keyed to the shaft, but free to move endwise. On this disk are cast ears 86, forming a pocket 87 in which are pivoted small levers 88 having adjusting screws 89 with jam nuts 90, as shown, so arranged that the screws will engage the inner beveled surface of a cupped or cone shaped ring 91. This ring 91 is loosely fitted to the outside of the collar and has a split band 92 working freely in a groove 93, which band is provided with trunnions 94 to be engaged by the shipper lever 95 upon the treadle shaft 96, which will be described further on. As shown in the drawing, the clutch is engaged, the cone shaped ring is forced as far in as it will go, pressing the adjusting screws inward, causing a pressure on the face of the little levers against the face of the solid collar, which acting through the pivot of the little levers, forces this clutch disk toward the brake drum disk, clamping the two fiber and the one steel disk tightly, and through the friction of their surfaces, driving the brake drum disk and the beveled gear as one solid wheel. The thrust against the brake drum disk and its sleeve is taken by the collar on the other side of the bearing, which is pinned to the shaft and drives the screw, as heretofore described. Moving the shipper lever 95 to the left would withdraw the cone shaped ring and release the clutch and allow the brake drum and gears, which are attached to it, to come to rest. The fiber disk and steel disk are not fastened in any way to either member of the clutch, but are simply loose and present only additional friction surface for continued slipping action of the clutch, as is necessitated when running the hammer at various speeds and to get the varied force of blow required for the many different kinds of work.

To insure the prompt stopping of the hammer when the clutch is released, there is provided a brake band 97, encircling the brake drum. This brake band is composed of bent pieces 98 and 99 of flat steel, lined with fibrous material 100. The upper ends of the bands being bent at right angles, as seen at 101, are drilled to fit an adjusting screw 102. This screw is a long cap screw, having a nut 103 pinned to it to hold the end of the band close to the head, this screw being supported in a boss 104, depending from the upper surface of the base casting, and is secured in position by a jam nut 105, as shown. Each band has its individual adjustment. At the lower end, the bands have projecting flanges 106 with space between for the end of the rock shaft 107, which is flattened, as seen at 108, and has a hole 109 through which passes the bolt 110 holding the ends of the bands together, and carrying a spring 111, which by its pressure applies the brake. In the position shown the clutch being engaged, the brake is shown disengaged and the rock shaft is partially rotated and by the flattened portion engaging the ends of the brake bands, forces them apart and releases the brakes. It will be easily understood that when the clutch is released, the rock shaft will be allowed to come back to a vertical position and the spring will force the brake bands together and apply the brakes. The rock shaft is operated by means of a lever rod 112, driven into it hooked upon its outer end, as seen at 113, and engaged by a looped connection 114, which is pivoted, as at 115, in the outer end of an extending arm 116, integral with the shipper lever 95. It will also be seen that this rock shaft is journaled in the lower edge of the deep flanges depending from the subframe and is amply stiff and strong to take the twisting and strain of the brake bands at the under side. The shipper lever 95 is set screwed to a cross shaft in the upper forward corner of the base casting and this shaft extends outwardly on each side and has knuckles keyed to it, into which are fitted the ends of the bail shaped treadle 117. The weight of this treadle 117 is counterbalanced by a weight 118 extending backward inside of the base casting, so that when the foot is removed from the treadle, the clutch is automatically released and the brake applied, and the construction of this entire mechanism is such that the speed and power of the hammer blow is perfectly under the control of the operator, as is also the brake which serves to stop the hammer instantly, as desired.

Particular care has been taken in the design of this hammer to facilitate the quick changes and absolute control of the machine by the operator, and to make it a one man machine, requiring no helper for ordinary work. The construction of the driving clutch is such that a very moderate movement of the treadle starts the machine. At the same time the speed, which depends upon the pressure applied to the clutch mechanism, is perfectly controlled and, as before stated, the brake is applied by an adjustable spring tension, which never allows the brake to be unduly tightened, and at the same time gives a quick, smooth stop to the hammer. The means for fastening the slide is at the front and left hand side near the handle for operating the elevating screw, so that practically one movement of the operator is all that is required to perform the operation of raising or lowering the head, and it is done instantly. By raising the head of the hammer on the column I raise the guides and all which keeps the same relationship between the bottom of the head and the bottom of the guides, so that the head never runs far out of the guides at the lower end. By making this adjustment on the column it enables me to make a short connection on the spring so I am enabled to work a wagon tire that is not less than thirty inches in diameter. I may employ a beck horn for welding bands that are too small for the head to work in by turning them down toward the floor. In some instances, I may attach the means for locking the radial arm to the treadle mechanism, so that when the treadle is depressed the radial arm will be locked and when said treadle is raised the radial arm will be loosened.

Various modifications in detail may be resorted to without departing from the spirit of the invention or sacrificing any of its advantages. In some instances I may support the hammer from overhead, as from the ceiling.

In Fig. 19 I have shown the die 119 with its shank 120 provided with a groove 121 to receive the key or wedge 122 which latter is received in a socket in the head 123. This construction permits of turning the die at any angle to the head. This will be found very convenient in many cases, as for instance in forging tongs when one die is turned at right angles to the other and all the offsets made at one heat. Very little hand work will be required.

What is claimed as new is:—

1. In a power hammer, the combination with a member provided with a guideway, of a slide movable in said guideway, a bracket pivotally mounted upon said slide, hammer mechanism carried by said bracket, a main shaft, and driving means connected between said shaft and said hammer mechanism.

2. In a power hammer, the combination with a member provided with a guideway, of a slide movable in said guideway, a bracket swingable in a horizontal plane on said slide, hammer mechanism carried by said bracket, a main shaft, driving mechanism connecting said shaft and said hammer mechanism, and means operable from said shaft for moving said slide in said guideway.

3. In a power hammer, the combination with a member provided with a guideway, of a slide movable in said guideway, an arm swingable in a horizontal plane mounted upon said slide, a sleeve arranged to journal in said slide, hammer mechanism carried by said arm, a main shaft, and driving mechanism connecting said shaft and said hammer mechanism, including a shaft feathered in said sleeve.

4. In a power hammer, the combination with a member provided with a guideway, of a slide movable in said guideway, an arm swingable in a horizontal plane mounted upon said slide, hammer mechanism carried by said arm, means for actuating said hammer mechanism, and means for clamping the swinging arm in position.

5. In a power hammer, the combination with a member provided with a guideway, of a slide movable in said guideway, an arm swingable in a horizontal plane mounted upon said slide, hammer mechanism carried by said arm, means for actuating said hammer mechanism, and means for clamping the swinging arm in position, including a part adjustably held against said arm.

6. In a power hammer, the combination with a member provided with a guideway, of a slide movable in said guideway, said slide provided with an opening in the upper end thereof and a boxing at the lower end thereof, a sleeve carried by said slide, a swinging arm fitted on said sleeve at its upper end and in said boxing at its lower end, hammer mechanism carried by said arm, and means for actuating said hammer mechanism.

7. In a power hammer, the combination with a member provided with a guideway, of a slide movable in said guideway, said slide provided with an opening in the upper end thereof and a boxing at the lower end thereof, a sleeve carried by said slide, a swinging arm fitted on said sleeve at its upper end and in said boxing at its lower end, hammer mechanism carried by said arm, and means for actuating said hammer mechanism including a sleeve carried by said arm and a shaft feathered in said last named sleeve.

8. In a power hammer, the combination with a member provided with a guideway, of a slide movable in said guideway, an arm swingable in a horizontal plane on said slide, hammer mechanism carried by said arm, and means for actuating said hammer mechanism, including a sleeve arranged to journal in said slide and a shaft feathered in said sleeve.

9. In a power hammer, the combination with a member provided with a guideway, of a slide movable in said guideway, an arm swingable in a horizontal plane on said slide, hammer mechanism carried by said arm, a main shaft, driving mechanism connecting said shaft and said hammer mechanism, a bracket on said member, and mechanism operable from said shaft for moving said slide in said guideway, said last mentioned mechanism including a screw threaded in said slide and having the upper end thereof journaled in said bracket and provided with a thrust bearing composed of two thin rings, a ball ring and balls, and a collar screwed and pinned to the upper end of the screw.

FRED E. SUTHERLAND.

Witnesses:
   ALMORA A. SWARTMORE,
   JAMES A. BROWN.